United States Patent
Duan

(10) Patent No.: US 8,352,823 B2
(45) Date of Patent: Jan. 8, 2013

(54) METHODS AND SYSTEMS FOR HANDLING ARQ RESETS

(75) Inventor: Quanzhu Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 12/768,654

(22) Filed: Apr. 27, 2010

(65) Prior Publication Data

US 2010/0281324 A1    Nov. 4, 2010

Related U.S. Application Data

(60) Provisional application No. 61/174,832, filed on May 1, 2009.

(51) Int. Cl.
*H04L 1/18* (2006.01)

(52) U.S. Cl. .............. 714/748; 370/324; 370/350

(58) Field of Classification Search .............. 714/748; 370/324, 350
See application file for complete search history.

(56) References Cited

U.S. PATENT DOCUMENTS

| | | | | |
|---|---|---|---|---|
| 7,359,345 | B2 * | 4/2008 | Chang et al. | 370/322 |
| 7,646,742 | B2 * | 1/2010 | Petrovic et al. | 370/328 |
| 7,676,721 | B2 * | 3/2010 | Kim | 714/747 |
| 7,757,148 | B2 * | 7/2010 | Schaap et al. | 714/748 |
| 7,979,767 | B2 * | 7/2011 | Schaap et al. | 714/748 |
| 2003/0092458 | A1 | 5/2003 | Kuo | |

FOREIGN PATENT DOCUMENTS

EP    1507365 A2    2/2005

OTHER PUBLICATIONS

International Search Report and Written Opinion—PCT/US2010/033063, International Search Authority—European Patent Office—Jul. 6, 2010.
Digital cellular telecommunications system (Phase 2+); General Packet Radio Service (GPRS); Base Station System (BSS)—Serving GPRS Support Node (SGSN) interface; Network service (3GPP TS 48.016 version 7.4.0 Release 7); ETSI TS 148 016 ETSI Standards, LIS, Sophia Antipolis Cedex, France, vol. 3-G2, No. V7.4.0, Apr. 1, 2008, XP014041836 ISSN: 0000-0001 p. 32, paragraph 7.3—p. 34, paragraph 7.4.
LGE: "Correction on the Reset Procedure" 3GPP Draft; R2-052784 Proposed CR to 25.322 [REL-6] on Reset Procedure, 3rd Generation Partnership Project (3GPP), Mobile Competence Centre ; 650, Route des Lucioles ; F-06921 S0phia-Antip0lis Cedex ; France, vol. RAN WG2, no. Seoul, Korea; 20051102, Nov. 2, 2005, XP050129780 [retrieved on Nov. 2, 2005] p. 3, paragraph 11.4.3.

* cited by examiner

*Primary Examiner* — Esaw Abraham
(74) *Attorney, Agent, or Firm* — Tyler J. Overall

(57) ABSTRACT

Systems and methods for handling automatic repeat request (ARQ) resets are described. A first device may receive a message initiating an ARQ reset procedure transmitted by a second device. The first device may determine if both the first and second devices have initiated an ARQ reset procedure. The first device may take action to limit a loss of blocks of data exchanged between the first and second devices, if both the first and second devices have initiated an ARQ reset procedure.

12 Claims, 16 Drawing Sheets

METHODS AND SYSTEMS FOR HANDLING ARQ RESETS

CLAIM OF PRIORITY

This application claims the benefit of priority from U.S. Provisional Patent Application Ser. No. 61/174,832, entitled "Methods and Systems using Improved ARQ Reset Mechanism" and filed May 1, 2009, which is assigned to the assignee of this application and fully incorporate herein by reference for all purposes.

TECHNICAL FIELD

Certain embodiments of the present disclosure generally relate to wireless communication and, more particularly, to automatic repeat request (ARQ) reset.

SUMMARY

Certain embodiments of the present disclosure provide a method for wireless communication. The method generally includes receiving, at a first device, a message initiating an automatic repeat request (ARQ) reset procedure transmitted by a second device, determining if both the first and second devices have initiated an ARQ reset procedure, and taking action to limit a loss of blocks of data exchanged between the first and second devices, if both the first and second devices have initiated an ARQ reset procedure.

Certain embodiments of the present disclosure provide an apparatus for wireless communication. The apparatus generally includes logic for receiving, at a first device, a message initiating an automatic repeat request (ARQ) reset procedure transmitted by a second device, logic for determining if both the first and second devices have initiated an ARQ reset procedure, and logic for taking action to limit a loss of blocks of data exchanged between the first and second devices, if both the first and second devices have initiated an ARQ reset procedure.

Certain embodiments of the present disclosure provide an apparatus for wireless communication. The apparatus generally includes means for receiving, at a first device, a message initiating an automatic repeat request (ARQ) reset procedure transmitted by a second device, means for determining if both the first and second devices have initiated an ARQ reset procedure, and means for taking action to limit a loss of blocks of data exchanged between the first and second devices, if both the first and second devices have initiated an ARQ reset procedure.

Certain embodiments of the present disclosure provide a computer-program storage apparatus for wireless communication, comprising a memory device having instructions stored thereon, the instructions being executable by one or more processors and the instructions. The storage apparatus generally includes instructions for receiving, at a first device, a message initiating an automatic repeat request (ARQ) reset procedure transmitted by a second device, instructions for determining if both the first and second devices have initiated an ARQ reset procedure, and instructions for taking action to limit a loss of blocks of data exchanged between the first and second devices, if both the first and second devices have initiated an ARQ reset procedure.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, that the appended drawings illustrate only certain typical embodiments of this disclosure and are therefore not to be considered limiting of its scope, for the description may admit to other equally effective embodiments.

DETAILED DESCRIPTION

Figure 1:
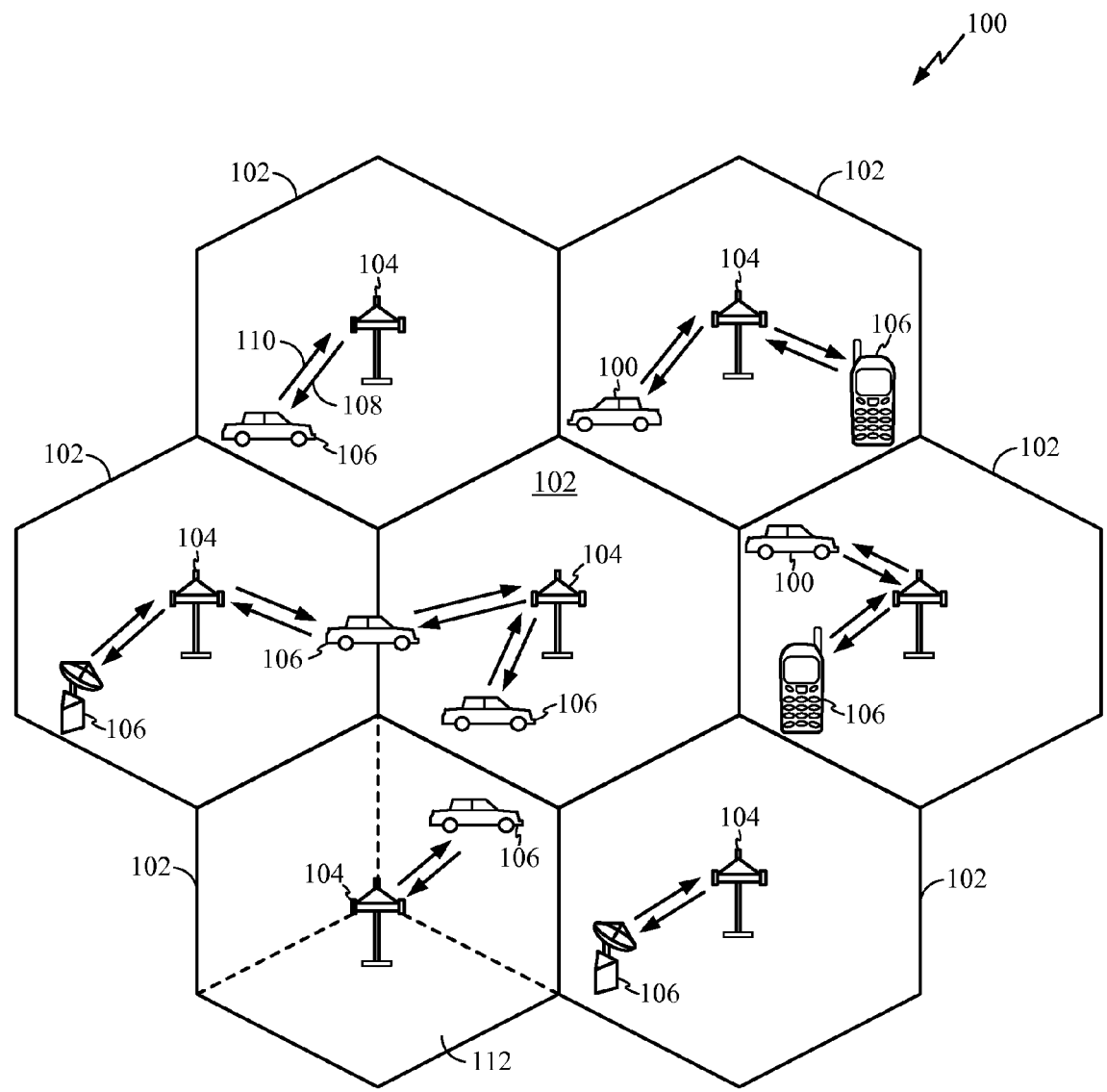
FIG. 1 illustrates an example wireless communication system, in accordance with certain embodiments of the present disclosure.

Orthogonal frequency-division multiplexing (OFDM) and orthogonal frequency division multiple access (OFDMA) wireless communication systems, such as those compliant with the IEEE 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

To improve the reliability of data transmission, some wireless systems employ an automatic repeat-request (ARQ)

scheme where acknowledgments and timeouts may be used to achieve reliable data transmission over an unreliable service. A receiver (e.g., an MS) may use an acknowledgement to notify a transmitter (e.g., a BS) whether or not a packet was successfully received and decoded. If the packet was not successfully received or decoded, the receiver may signal the transmitter via a negative acknowledgment (NAK), prompting the transmitter to retransmit the packet.

Occasionally, a state associated with the ARQ scheme may be reset. The 802.16 standard specifies a set of actions taken to reset the state associated with an ARQ scheme. The standard addresses an ARQ reset initiated by a receiver and an ARQ reset initiated by transmitter, but is silent with respect to certain ARQ reset scenarios.

Embodiments of the present propose a method and apparatus for ignoring at least one of two previously initiated ARQ resets when it is determined that both the RX and TX initiated independent ARQ reset procedures. For example, a TX may initiate an ARQ reset procedure by sending a Type 0 reset message to a RX, but subsequently receive a Type 0 reset message sent by the RX. Certain embodiments of the present disclosure may enable the TX, which received the Type 0 reset message sent by the RX after initiating its own ARQ reset, to ignore the RX initiated ARQ reset continuing, instead, with the TX initiated ARQ reset.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
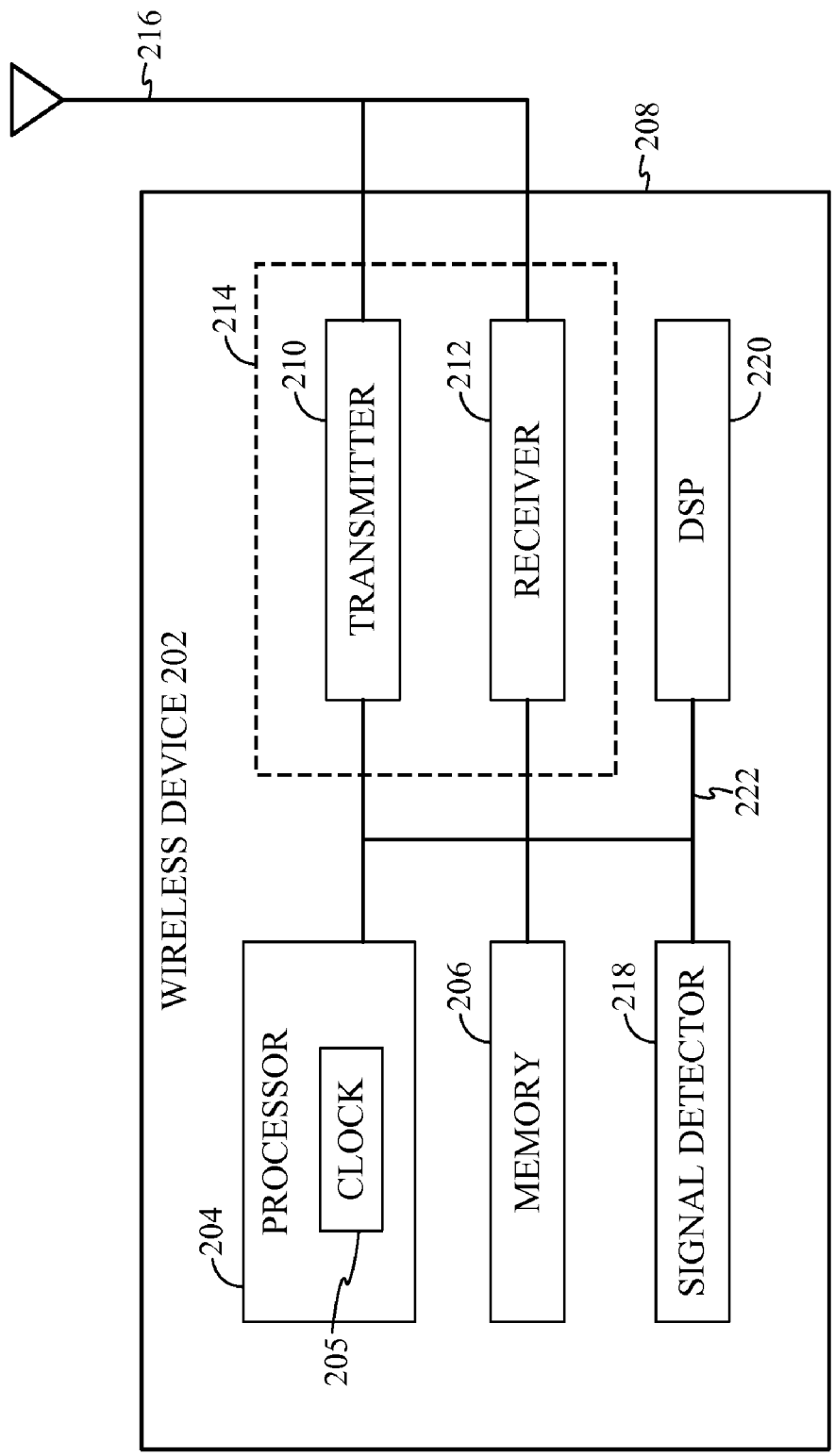
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 that controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 can perform operations based on program instructions stored within the memory 206. The instructions in the memory 206 may be executable to implement what is described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
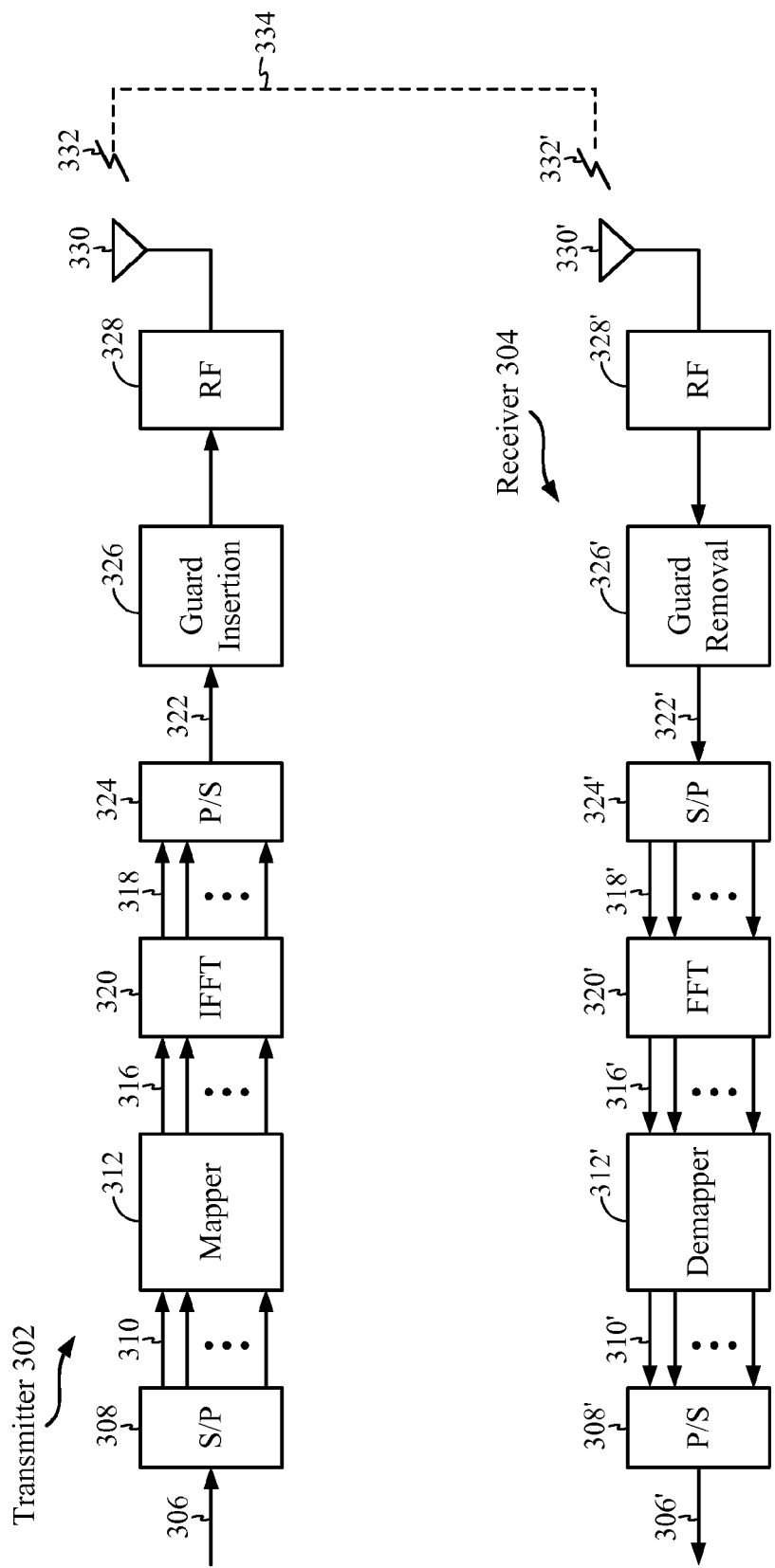
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary ARQ Reset

In a WiMAX network, an ARQ mechanism may be implemented as part of the Media Access Control (MAC) layer to improve data transmission reliability over an unreliable service. When implemented, ARQ may be enabled on a connection-by-connection basis and negotiated during the connection creation.

Figure 4:
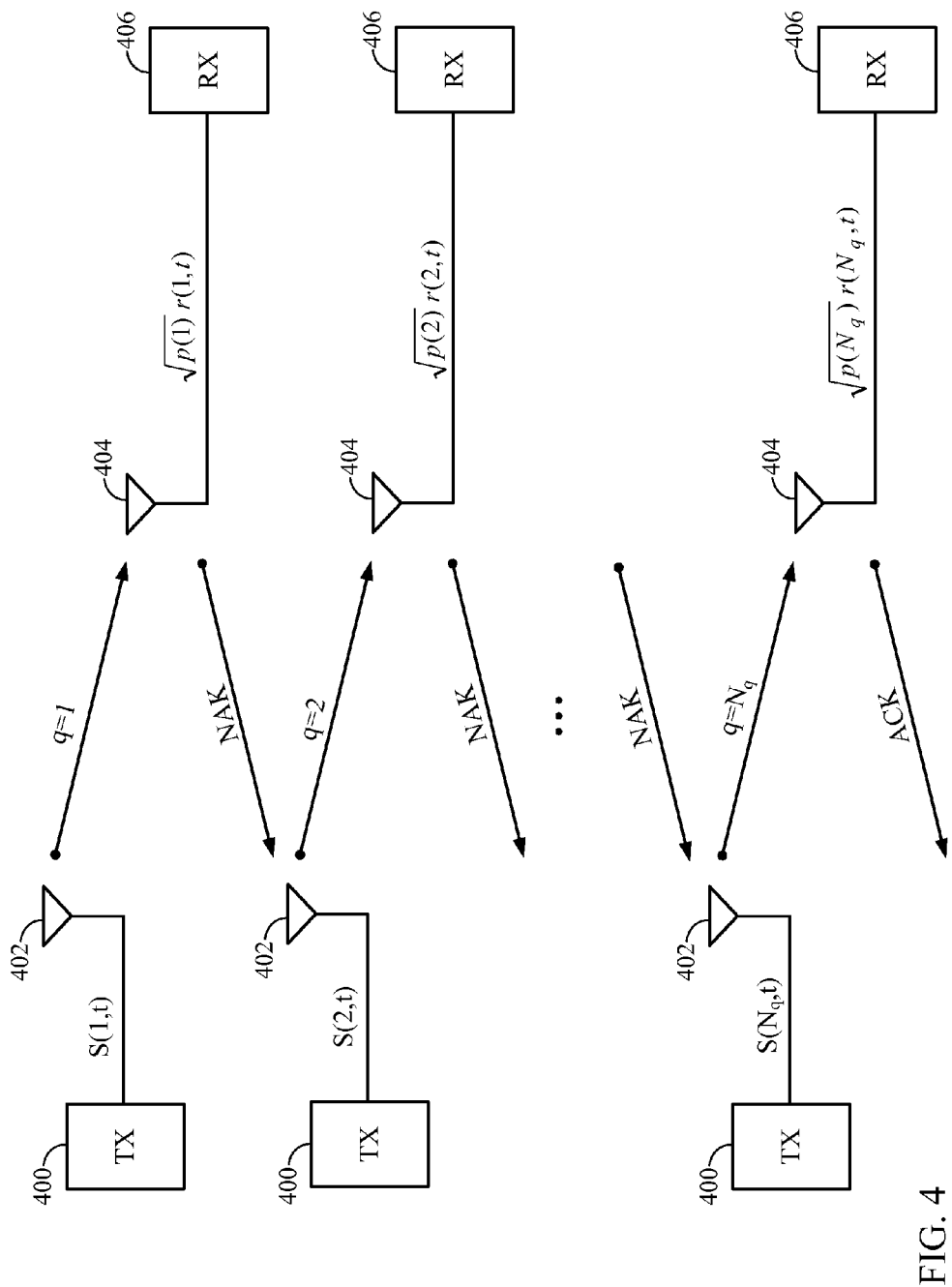
FIG. 4 illustrates an automatic repeat-request (ARQ) transmission, in accordance with certain embodiments of the present disclosure.

FIG. 4 illustrates a basic sequence of ARQ transmissions. A transmitter (TX) 400, such as the base station, may broadcast a first signal s(1,t) containing an ARQ message via an antenna 402. An antenna 404 of a receiver (RX) 406, contained within a wireless device such as a user terminal, may receive the broadcast first signal as received signal r(1,t) with a certain power $\sqrt{p(1)}$.

The first received signal r(1,t) may be processed and decoded by the receiver (RX) 406. In decoding the message, error correction bits (e.g., a checksum) generated for the data payload may be compared against error correction bits sent in the message. A match between the generated and transmitted error correction bits may indicate the decoded message is correct, while a mismatch may indicate one or more of the bits in the decoded message are not correct.

If the decoded message is not correct, the RX 406 transmits a not-acknowledged (NAK) signal back to the transmitter (TX) 400. The TX 400, upon receiving the NAK signal, may retransmit the same signal s(q,t) containing the ARQ message again for the qth iteration (q=2 in the illustrated example). This process is repeated until (at q=Nq) the decoded message is correct and the RX 406 transmits an ACK signal to the TX 400, indicating successful reception and decoding of the correct ARQ message.

For ARQ-enabled connections, the TX may partition each service data unit (SDU) into a set of fragments (or blocks) for separate transmission. The size of the blocks formed for transmission may be specified by a connection tuple parameter.

After dividing the SDU into blocks, the TX may begin sending the set of blocks to the RX. If a block was not successfully received or decoded, the RX may signal the transmitter via a negative acknowledgment (NAK), prompting the transmitter to retransmit the block. To manage the transmission of one or more sets of block, a TX or RX may assign a state to each block.

The state of each block may either be "not-sent," "outstanding," "discarded," or "waiting-for-retransmission." All blocks being in the "not-sent" state. After a block is sent, it enters the "outstanding" state for a previously negotiated period of time. While the block is in the "outstanding" state, it is either acknowledged, then placed in the "discarded" state or transitioned to the "waiting-for-retransmission" state.

At times, it may be beneficial for the TX or the RX to reset the states of the set of blocks. For example, it may be beneficial for the state of blocks sent between the RX and the TX to be synchronized. Accordingly, the current version of the WiMAX standard, TX initiated ARQ resets and RX initiated ARQ resets are provided for.

Figure 5A:
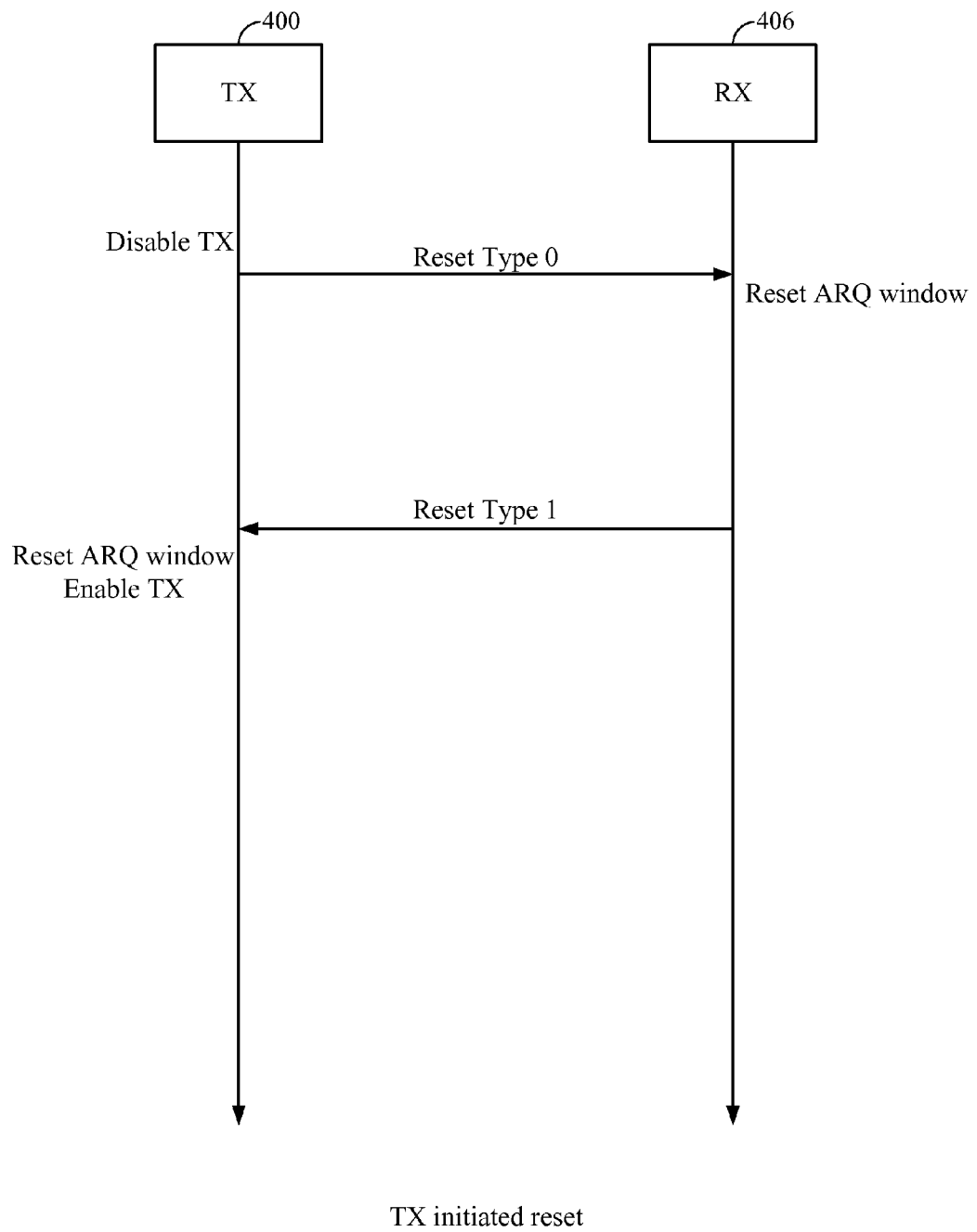
FIG. 5A illustrates a transmitter (TX) initiated ARQ reset.

FIG. 5A illustrates a transmitter (TX) initiated ARQ reset. Upon determining it is beneficial to perform an ARQ reset, the TX may initiate ARQ reset operations by sending a Type 0 reset message to the RX. The TX may also disable additional block transmissions. After receiving the Type 0 reset message, the RX may transition blocks from the "outstanding" and the "waiting-for-retransmission" to the "discarded" state. The RX may then discard blocks in the "discarded" state and respond to the TX with a Type 1 reset message. In response to receiving the Type 1 reset the TX may also transition blocks from the "outstanding" and the "waiting-message, for-retransmission" to the "discarded" state and discard blocks in the "discarded" state before enabling additional block transmissions.

Figure 5B:
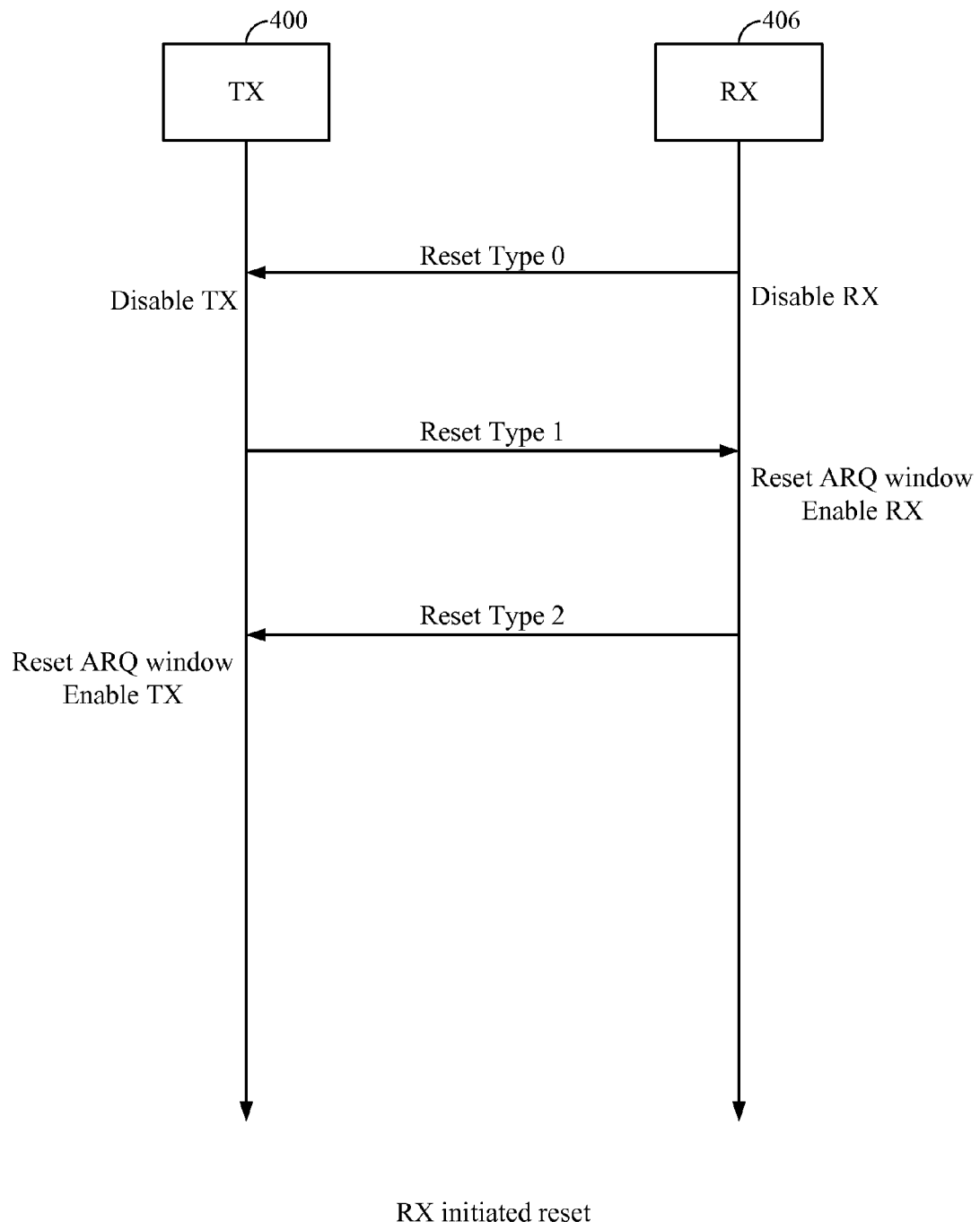
FIG. 5B illustrates a receiver (RX) initiated ARQ reset.

FIG. 5B illustrates a receiver (RX) initiated ARQ reset. Upon determining it is beneficial to perform an ARQ reset, the RX may initiate ARQ reset operations by sending a Type 0 reset message to the TX and disable the reception of additional blocks. Upon receiving a Type 0 reset message from the RX, the TX may disable additional block transmissions and respond with a Type 1 reset message. After receiving the Type 1 reset message from the TX, the RX may transition blocks from the "outstanding" and the "waiting-for-retransmission" to the "discarded" state, discard blocks in the "discarded" state, enable reception of additional blocks, and respond to the TX with a Type 2 reset message. In response to receiving the Type 2 reset message, the TX may also transition blocks from the "outstanding" and the "waiting-for-retransmission" to the "discarded" state and discard blocks in the "discarded" state before enabling additional block transmissions.

However, the current version of the 802.16 standard does not address scenarios in which both the TX and the RX determine it is beneficial to perform an ARQ reset within a narrow time interval. Consequently, both the TX and the RX may perform the operations for a TX initiated ARQ reset and an RX initiated ARQ reset.

Figure 6:
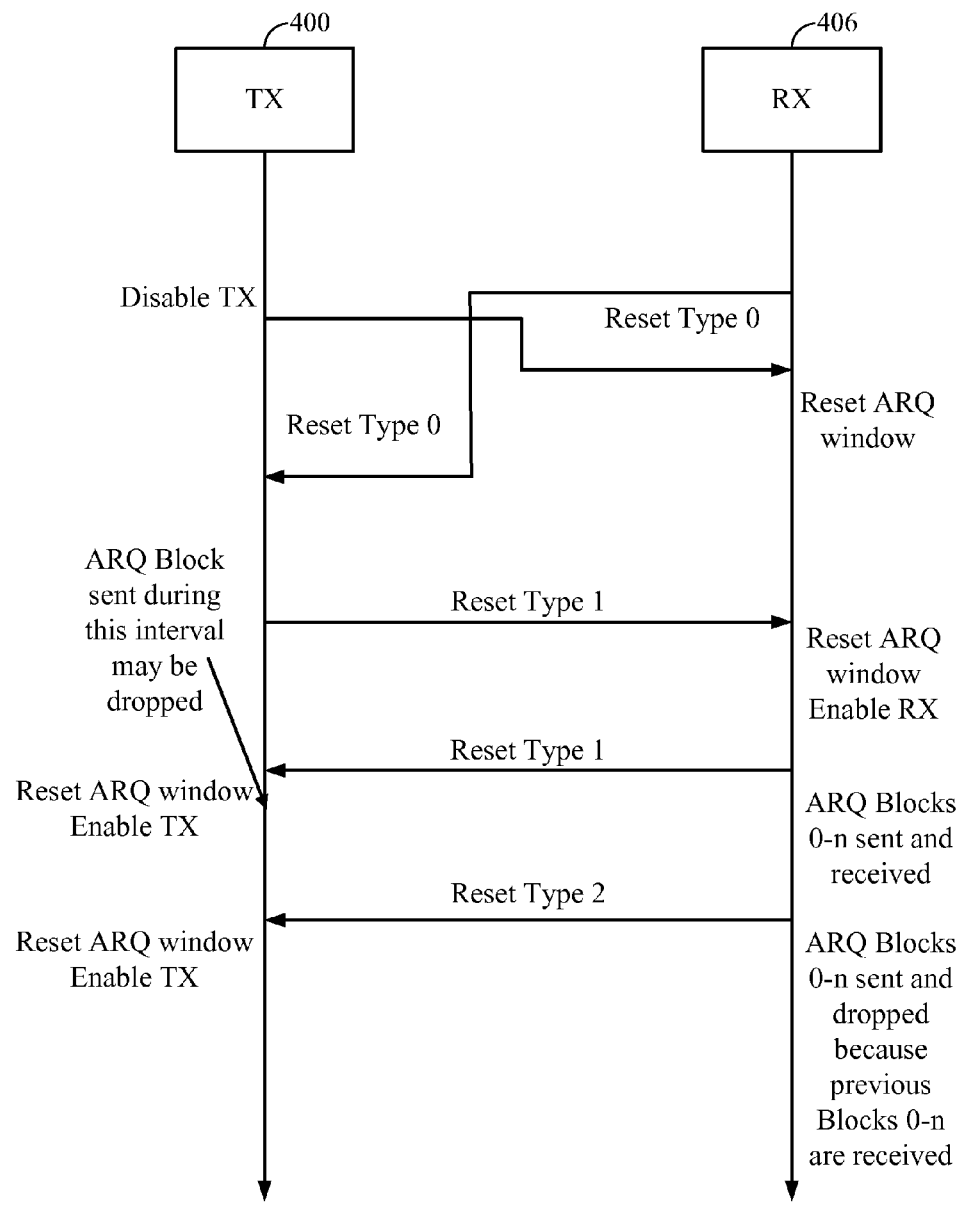
FIG. 6 illustrates a scenario in which both a TX and a RX initiate an ARQ reset within a narrow time interval.

As illustrated in FIG. 6, in some scenarios, this may result in the TX enabling additional block transmissions following the execution of a TX initiated ARQ reset (Reset Type 1 as shown), then receiving a Type 2 reset message from the RX. In response to receiving the Type 2 reset message, the TX may transition blocks from the "outstanding" and the "waiting-for-retransmission" to the "discarded" state and discard blocks in the "discarded" state.

As further illustrated in FIG. 6, ARQ blocks 0-n maybe sent during the interval between the TX enabling transmissions following receiving of Reset Type 1 (TX initiated Reset) and TX enabling transmissions following receiving of Reset Type 2 (RX initiated Reset). After the 2nd TX enabling transmission, new ARQ blocks sent to the RX maybe dropped, because the RX may have received the first batch of ARQ blocks.

To prevent blocks from being discarded before they are properly received and decoded, embodiments of the present disclosure propose a method and apparatus for ignoring at least one of two previously initiated ARQ reset procedures when it is determined that both a TX and a RX initiated ARQ reset procedures.

Figure 7:
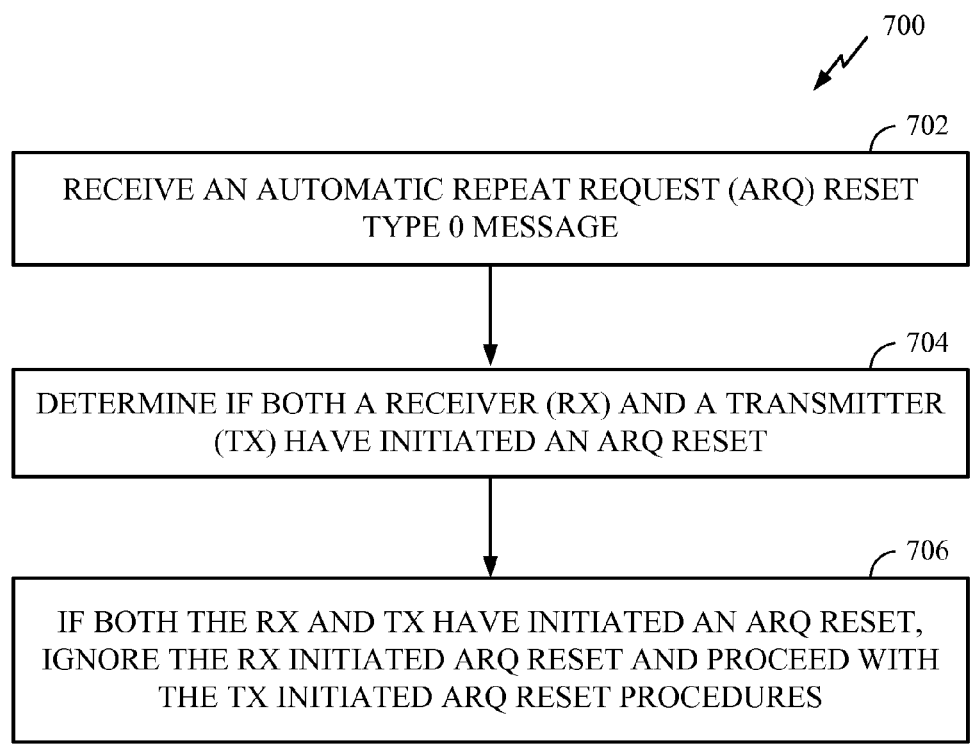
FIG. 7 illustrates example operations for selecting a TX initiated ARQ reset when both the TX and RX initiate an ARQ reset within a narrow time interval.

FIG. 7 illustrates example operations 700 for ignoring an ARQ reset previously initiated by the RX when it is determined that both the RX and the TX initiated independent ARQ reset procedures. Operations 700 may be performed by either the RX or the TX when performing ARQ reset procedures.

Operations 700 begin, at 702, with a device receiving an automatic repeat request (ARQ) Type 0 reset message. At 704, the device may determine if both it and its compliment (i.e., both the receiver (RX) and the transmitter (TX)) have initiated ARQ reset procedures.

If both the RX and the TX have initiated ARQ reset procedures, the device, at 706, may ignore the RX initiated ARQ reset procedures and proceed with the appropriate step of the TX initiated ARQ reset procedures.

Figure 8A:
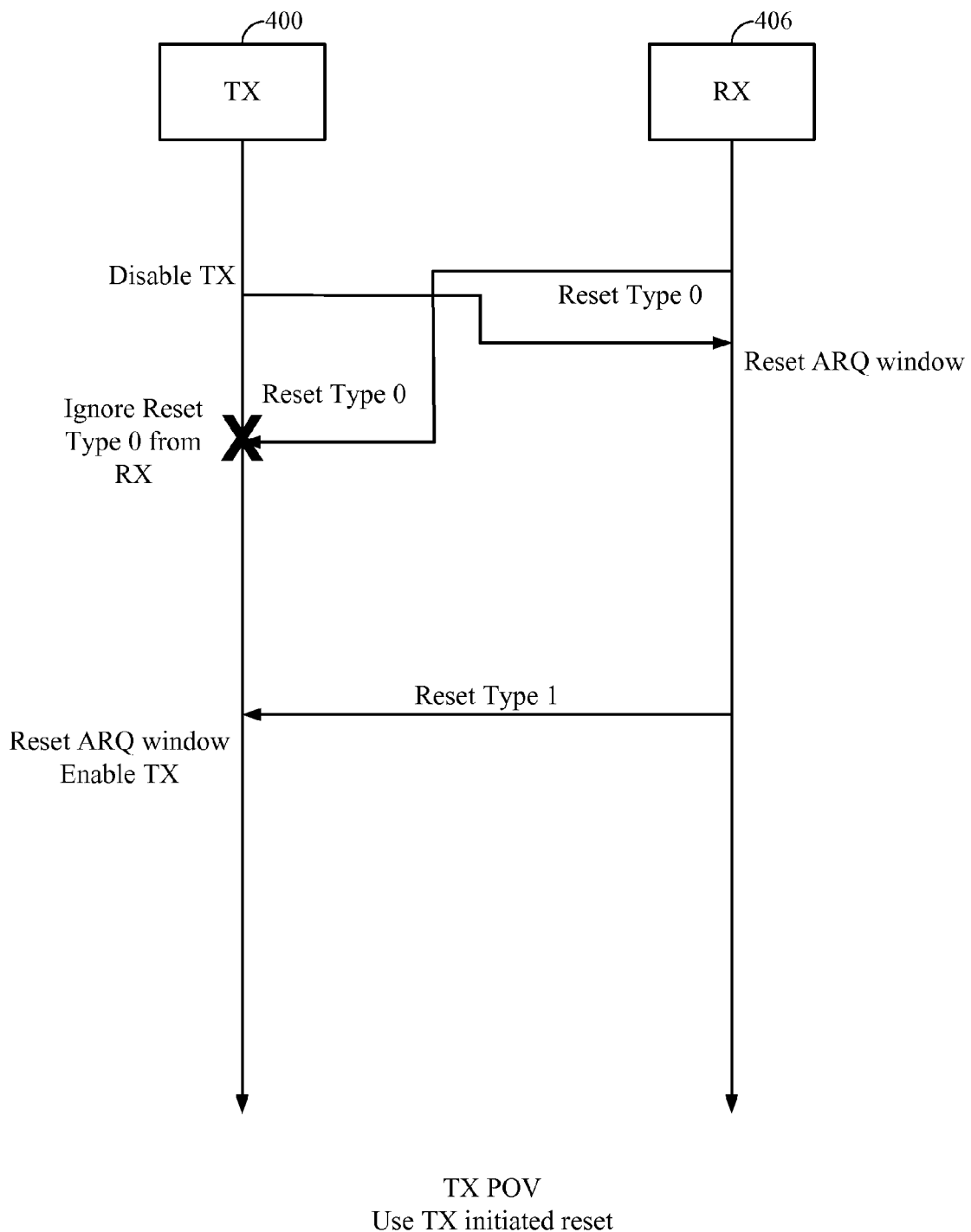
FIGS. 8A-B illustrate example exchanges utilizing the TX initiated ARQ reset when both a TX and a RX ARQ reset have been initiated within a narrow time interval.

FIG. 8A illustrates an example in which the transmitter 400 is the device employing operations 700. As illustrated, the TX 400 initiated an ARQ reset and subsequently received a Type 0 reset message from the RX indicating the RX 406 also initiated an ARQ reset. After determining both the RX and the TX initiated ARQ reset procedures, the TX ignores the Type 0 reset message received from the RX. Afterwards, the TX receives a Type 1 reset message from the RX corresponding to the TX initiated ARQ reset and completes the TX initiated ARQ reset procedures.

Figure 8B:
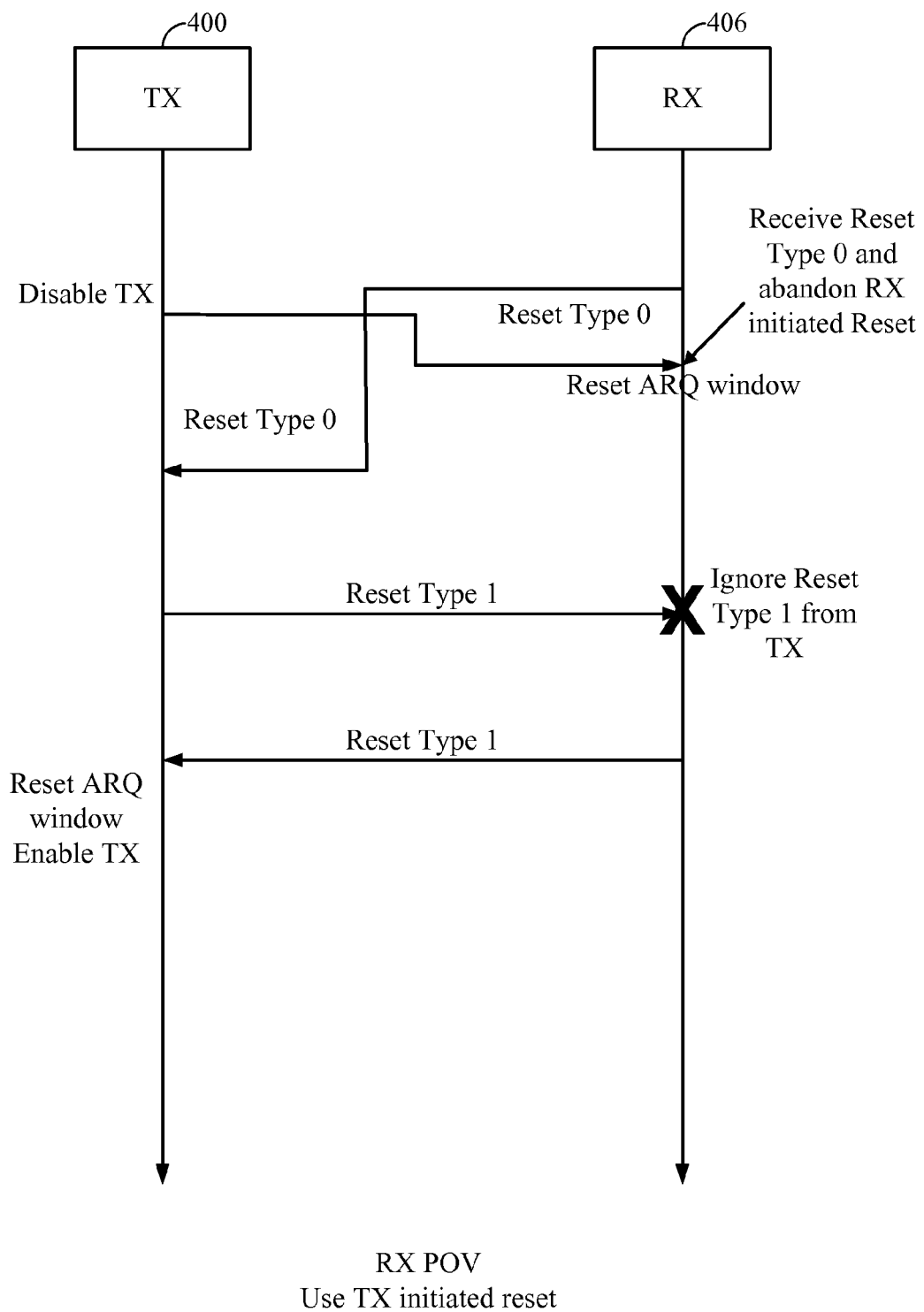

FIG. 8B illustrates an example in which the receiver 406 is the device employing operations 700. As illustrated, the RX 406 initiated an ARQ reset and subsequently received a Type 0 reset message from the TX indicating the TX 400 also initiated an ARQ reset. After determining both the RX and the TX initiated ARQ reset procedures, the RX abandons the RX initiated ARQ reset and ignores the Type 1 reset message received from the TX. The RX, then, proceeds to transmit the Type 1 reset message to the TX completing the TX initiated ARQ reset procedures.

Figure 9:
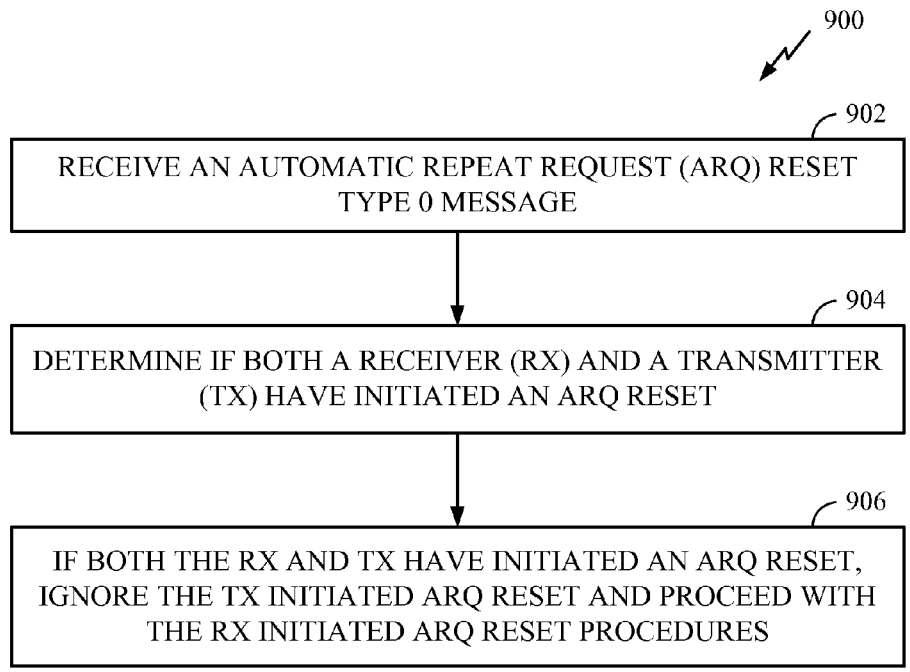
FIG. 9 illustrates example operations for selecting a RX initiated ARQ reset when both the TX and RX initiate an ARQ reset within a narrow time interval.

FIG. 9 illustrates example operations 900 for ignoring an ARQ reset previously initiated by the TX when it is determined that both the RX and the TX initiated independent ARQ reset procedures. Operations 900 may be performed by either the RX or the TX when performing ARQ reset procedures.

Operations 900 begin, at 902, with a device receiving an automatic repeat request (ARQ) Type 0 reset message. At 904, the device may determine if both it and its compliment (i.e., both the receiver (RX) and the transmitter (TX)) have initiated ARQ reset procedures.

If both the RX and the TX have initiated ARQ reset procedures, the device, at 906, may ignore the TX initiated ARQ reset procedures and proceed with the appropriate step of the RX initiated ARQ reset procedures.

Figure 10A:
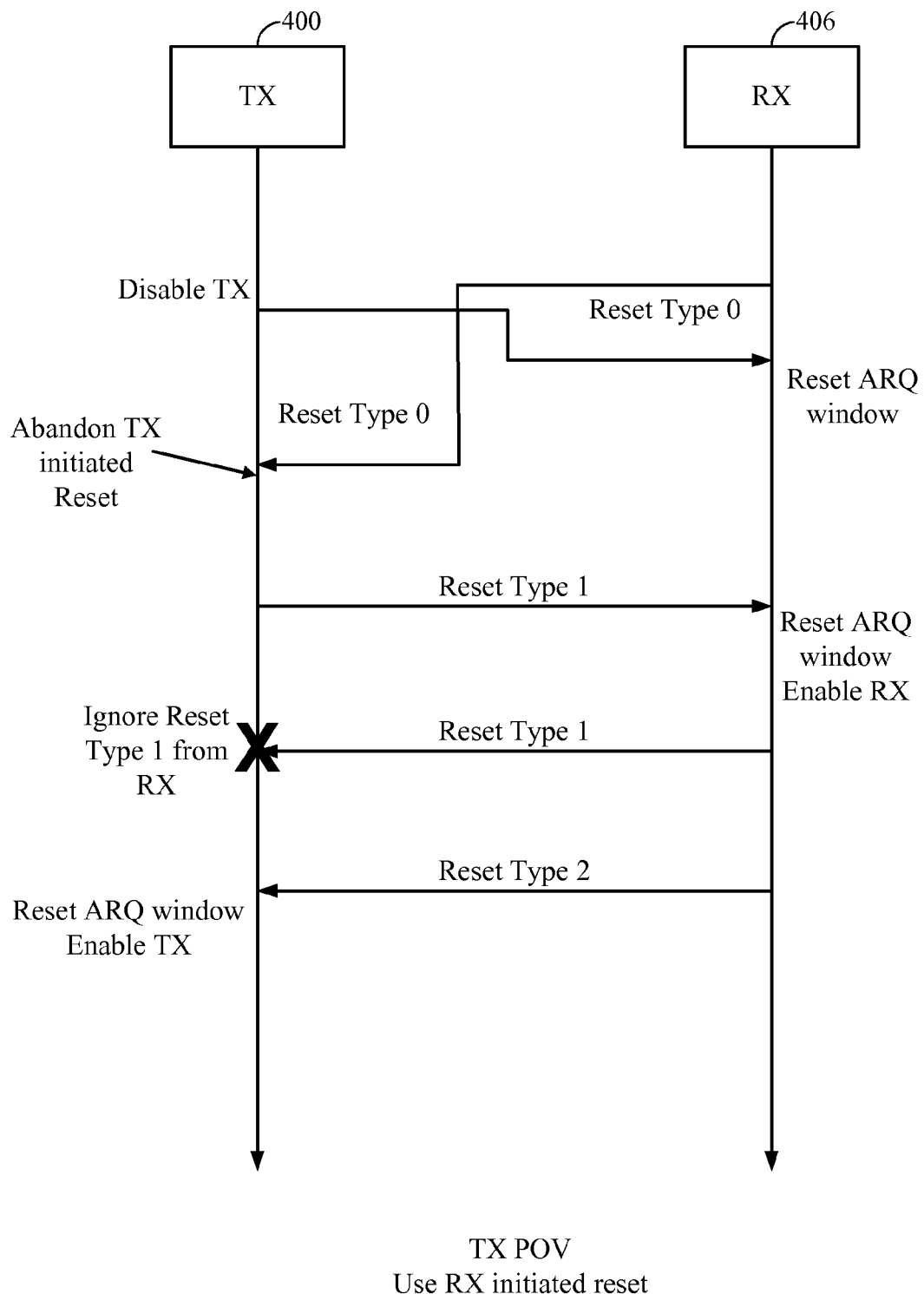
FIGS. 10A-B illustrate example exchanges utilizing the RX initiated ARQ reset when both a TX and a RX ARQ reset have been initiated within a narrow time interval.

FIG. 10A illustrates an example in which the transmitter 400 is the device employing operations 900. As illustrated, the TX 400 initiated an ARQ reset and subsequently received a Type 0 reset message from the RX indicating the RX 406 also initiated an ARQ reset. After determining both the RX and the TX initiated ARQ reset procedures, the TX may abandon the TX initiated ARQ reset and proceeds with sending a Type 1 reset message in accordance with the RX initiated ARQ reset. Additionally, if the TX receives a Type 1 reset message from the RX indicating the continuation of the TX initiated ARQ reset, the TX may ignore the Type 1 reset message received from the RX. Afterwards, the TX may receive a Type 2 reset message from the RX corresponding to the RX initiated ARQ reset and complete the RX initiated ARQ reset procedures.

Figure 10B:
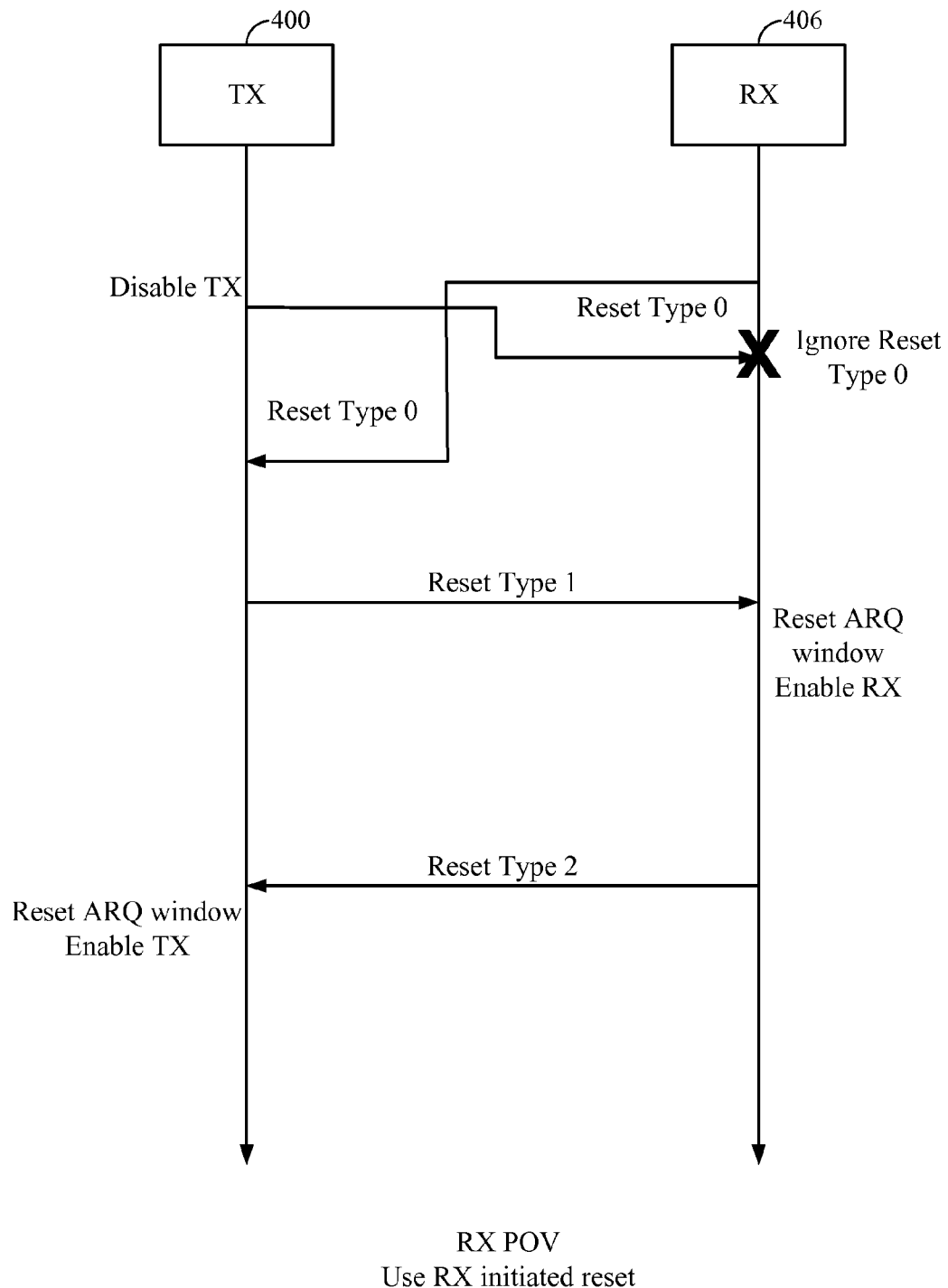

FIG. 10B illustrates an example in which the receiver 406 is the device employing operations 900. As illustrated, the RX 406 initiated an ARQ reset and subsequently received a Type 0 reset message from the TX indicating the TX 400 also initiated an ARQ reset. After determining both the RX and the TX initiated ARQ reset procedures, the RX ignores the Type 0 reset message received from the TX. The RX, then, proceeds with the RX initiated ARQ reset receiving a Type 1 reset message from the TX and, in response, sending a Type 2 reset message to the TX.

Figure 11:
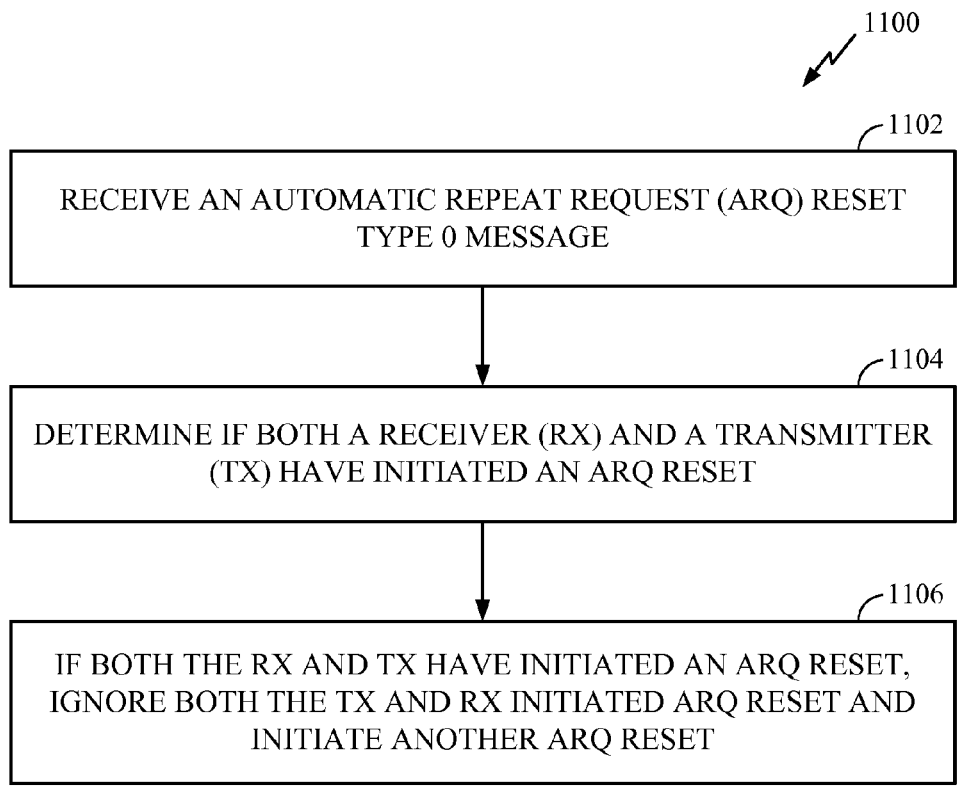
FIG. 11 illustrates example operations for ignoring both a TX and a RX initiated ARQ reset when both the TX and RX initiate an ARQ reset within a narrow time interval.

FIG. 11 illustrates example operations 1100 for ignoring both of the ARQ resets previously initiated by the TX and the RX when it is determined that both the RX and the TX initiated independent ARQ reset procedures. Operations 1100 may be performed by either the RX or the TX when performing ARQ reset procedures.

Operations 1100 begin, at 1102, with a device receiving an automatic repeat request (ARQ) Type 0 reset message. At 1104, the device may determine if both it and its compliment (i.e., both the receiver (RX) and the transmitter (TX)) have initiated ARQ reset procedures.

If both the RX and the TX have initiated ARQ reset procedures, the device, at 1106, may ignore both the TX and the RX initiated ARQ reset procedures and initiate another ARQ reset.

Figure 12A:
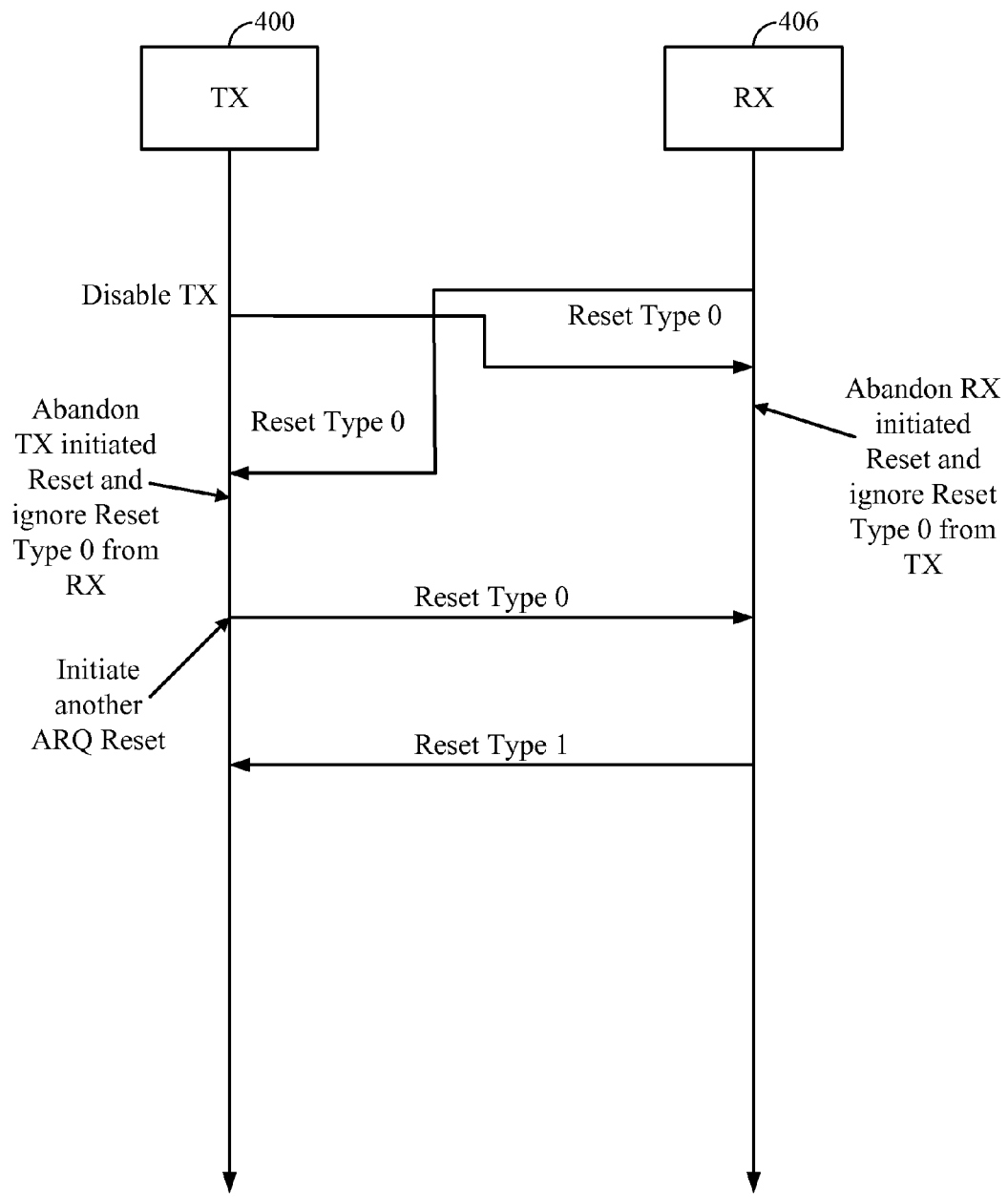
FIGS. 12A-B illustrate example exchanges utilizing the TX initiated ARQ reset when both a TX and a RX ARQ reset have been initiated within a narrow time interval.

FIG. 12A illustrates an example in which the transmitter 400 is the device employing operations 1100. As illustrated, the TX 400 initiated an ARQ reset and subsequently received a Type 0 reset message from the RX indicating the RX 406 also initiated an ARQ reset. After determining both the RX and the TX initiated ARQ reset procedures, the TX may abandon both the TX initiated ARQ reset and the RX initiated ARQ reset and, after an appropriate time, initiates another ARQ reset. Being a TX initiated ARQ reset, the subsequent ARQ reset procedures may include the TX sending a Type 0 reset message to the RX and receiving a Type 1 reset message from the RX in response.

Figure 12B:
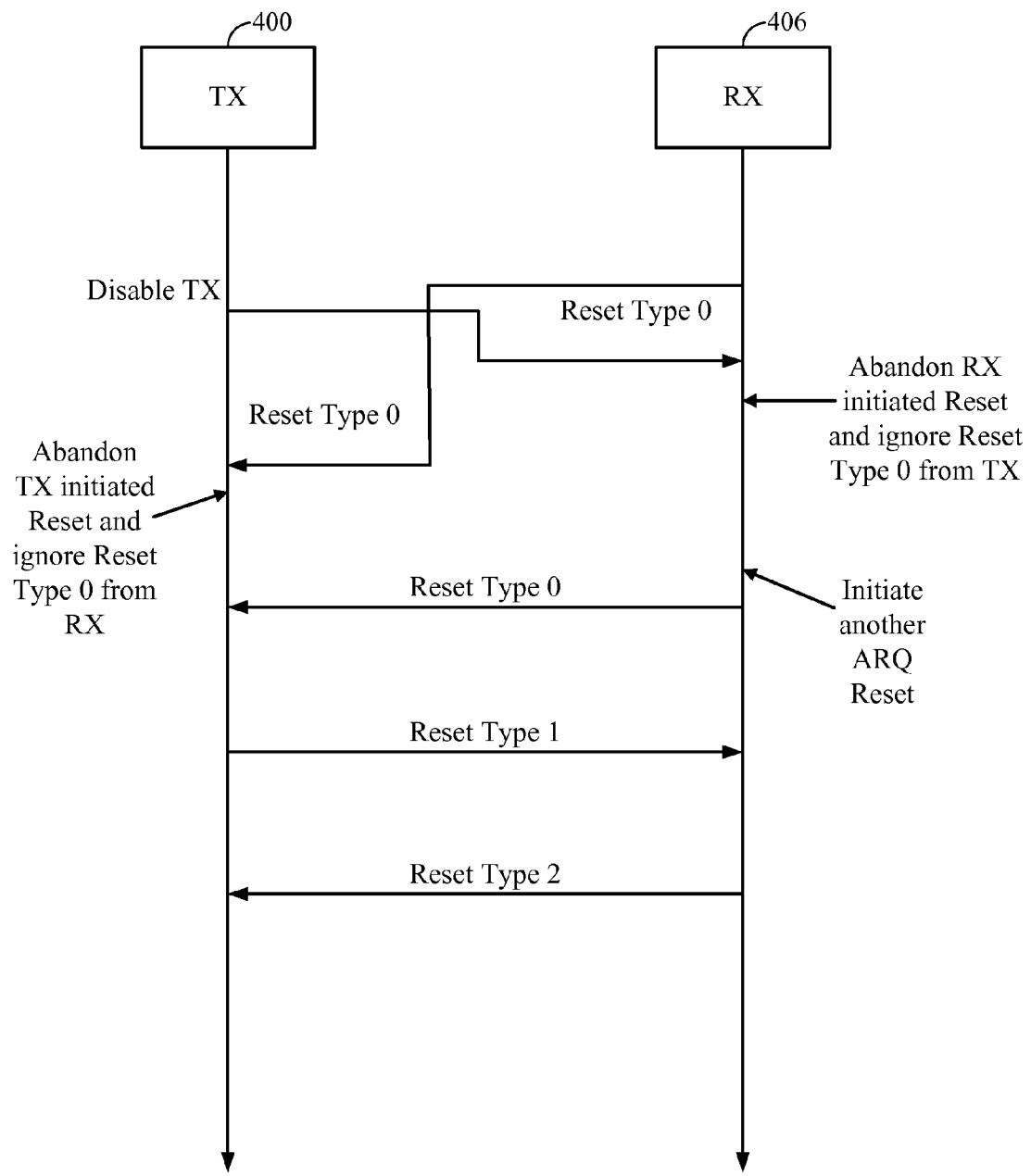

FIG. 12B illustrates an example in which the receiver 406 is the device employing operations 1100. As illustrated, the RX 406 initiated an ARQ reset and subsequently received a Type 0 reset message from the TX indicating the TX 400 also initiated an ARQ reset. After determining both the RX and the TX initiated ARQ reset procedures, the RX ignores both the TX initiated ARQ reset and the RX initiated ARQ reset and, after an appropriate time, initiates another ARQ reset. Being an RX initiated ARQ reset, the subsequent ARQ reset procedures may include the RX sending a Type 0 reset message to the TX, receiving a Type 1 reset message from the TX in response, and providing an additional message to the TX in the form of a Type 2 reset message.

Figure 7A:
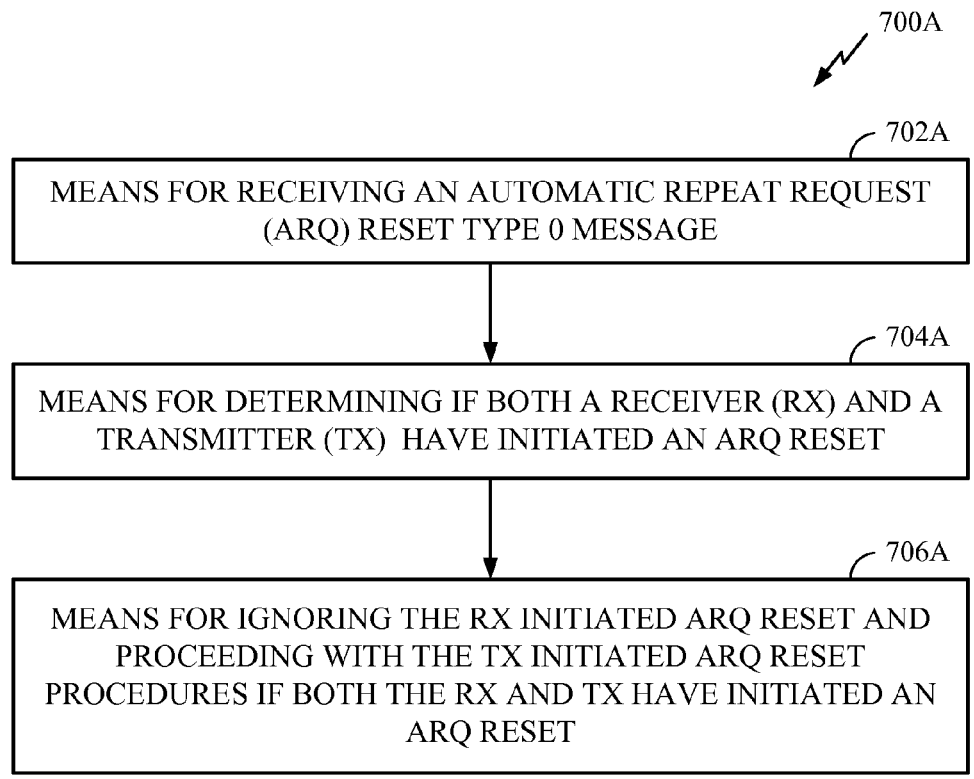
FIG. 7A is a block diagram of means corresponding to the example operations of FIG. 7.
Figure 9A:
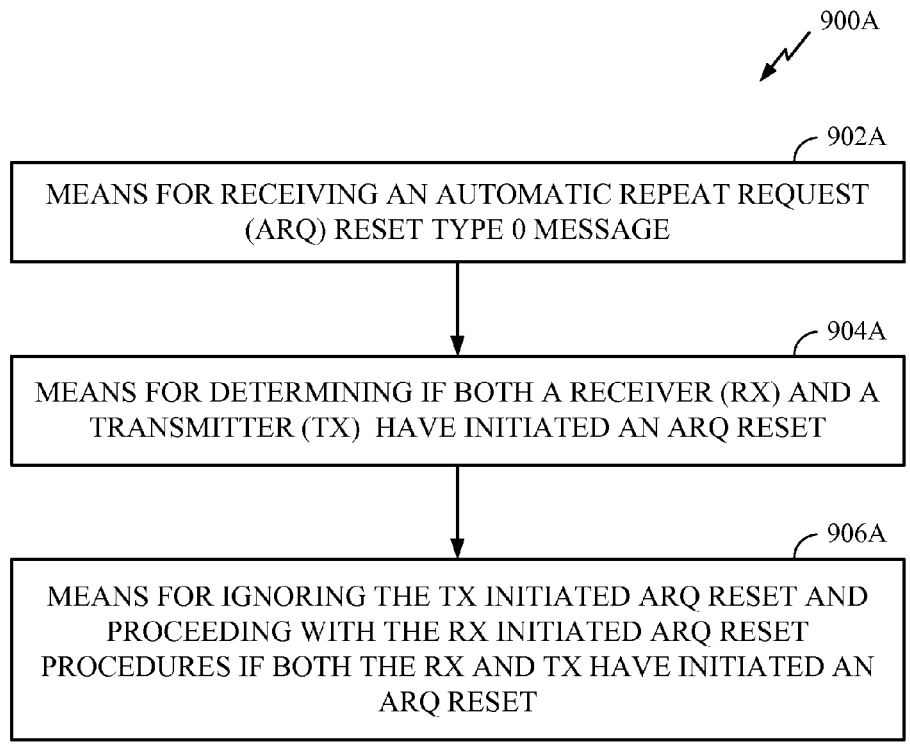
FIG. 9A is a block diagram of means corresponding to the example operations of FIG. 9.
Figure 11A:
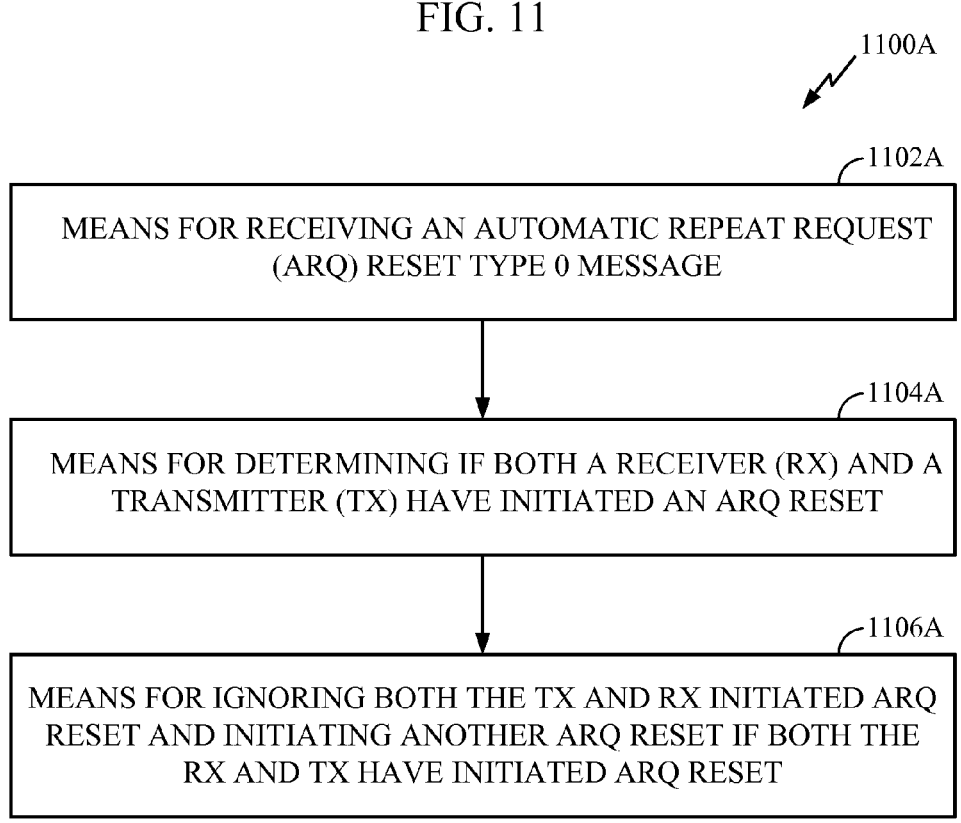
FIG. 11A is a block diagram of means corresponding to the example operations of FIG. 11.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-706 illustrated in FIG. 7 correspond to means-plus-function blocks 702A-706A illustrated in FIG. 7A. Similarly, blocks 902-906 illustrated in FIG. 9 and blocks 1102-1106 illustrated in FIG. 11 correspond to means-plus-function blocks 902A-906A illustrated in FIG. 9A and means-plus-function blocks 1102A-1106A illustrated in FIG. 11A, respectively.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical hardware blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable storage apparatus. A storage media may be any available media that can be accessed by a computer or processor. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   initiating, at a first device, a first automatic repeat request (ARQ) reset procedure;
   receiving, at the first device, a message initiating a second ARQ reset procedure transmitted by a second device;
   determining if both the first and second devices have initiated an ARQ reset procedure; and
   taking action to limit a loss of blocks of data exchanged between the first and second devices, if both the first and second devices have initiated an ARQ reset procedure, wherein taking action comprises:
      ignoring the message initiating the second ARQ reset procedure; and
      proceeding with the first ARQ reset procedure initiated by the first device.

2. The method of claim 1, wherein the first device and the second device are communicatively coupled via an ARQ-enabled connection.

3. A method for wireless communication, comprising:
   initiating, at a first device, a first automatic repeat request (ARQ) reset procedure;
   receiving, at the first device, a message initiating a second ARQ reset procedure transmitted by a second device;
   determining if both the first and second devices have initiated an ARQ reset procedure; and
   taking action to limit a loss of blocks of data exchanged between the first and second devices, if both the first and second devices have initiated an ARQ reset procedure, wherein taking action comprises:
      abandoning the first ARQ reset procedure;
      ignoring a message associated with the first ARQ reset procedure transmitted by the second device; and
      proceeding with the second ARQ reset procedure initiated by the second device.

4. A method for wireless communication, comprising:
   initiating, at a first device, a first automatic repeat request (ARQ) reset procedure;
   receiving, at the first device, a message initiating a second ARQ reset procedure transmitted by a second device;
   determining if both the first and second devices have initiated an ARQ reset procedure; and
   taking action to limit a loss of blocks of data exchanged between the first and second devices, if both the first and second devices have initiated an ARQ reset procedure, wherein taking action comprises:
      abandoning the first ARQ reset procedure;
      ignoring the message initiating the second ARQ reset procedure; and
      initiating a new ARQ reset procedure.

5. An apparatus for wireless communication, comprising:
   a processor;
   memory in electronic communication with the processor; and
   instructions stored in the memory, the instructions being executable by the processor to:
      initiate, at a first device, a first automatic repeat request (ARQ) reset procedure;
      receive, at the first device, a message initiating a second ARQ reset procedure transmitted by a second device;
      determine if both the first and second devices have initiated an ARQ reset procedure; and
      take action to limit a loss of blocks of data exchanged between the first and second devices, if both the first and second devices have initiated an ARQ reset procedure, wherein the instructions executable by the processor to take action comprise instructions executable by the processor to:
         ignore the message initiating the second ARQ reset procedure; and
         proceed with the first ARQ reset procedure initiated by the first device.

6. The apparatus of claim 5, wherein the first device and the second device are communicatively coupled via an ARQ-enabled connection.

7. An apparatus for wireless communication, comprising:
   a processor;
   memory in electronic communication with the processor; and
   instructions stored in the memory, the instructions being executable by the processor to:
      initiate, at a first device, a first automatic repeat request (ARQ) reset procedure;
      receive, at the first device, a message initiating a second ARQ reset procedure transmitted by a second device;
      determine if both the first and second devices have initiated an ARQ reset procedure; and
      take action to limit a loss of blocks of data exchanged between the first and second devices, if both the first and second devices have initiated an ARQ reset procedure, wherein the instructions executable by the processor to take action comprise instructions executable by the processor to:
         abandon the first ARQ reset procedure;
         ignore a message associated with the first ARQ reset procedure; and
         proceed with the second ARQ reset procedure initiated by the second device.

8. An apparatus for wireless communication, comprising:
   a processor;
   memory in electronic communication with the processor; and
   instructions stored in the memory, the instructions being executable by the processor to:

initiate, at a first device, a first automatic repeat request (ARQ) reset procedure;

receive, at the first device, a message initiating a second ARQ reset procedure transmitted by a second device;

determine if both the first and second devices have initiated an ARQ reset procedure; and take action to limit a loss of blocks of data exchanged between the first and second devices, if both the first and second devices have initiated an ARQ reset procedure, wherein the instructions executable by the processor to take action comprise instructions executable by the processor to:

abandon the first ARQ reset procedure;

ignore the message initiating the second ARQ reset procedure; and initiate a new ARQ reset procedure.

9. An apparatus for wireless communication, comprising:

means for receiving, at a first device, a message initiating a second automatic repeat request (ARQ) reset procedure transmitted by a second device, the first device initiating a first ARQ reset procedure, wherein if both the first and second devices have initiated an ARQ reset procedure, action is taken to limit a loss of blocks of data exchanged between the first and second devices, wherein the action taken comprises:

ignoring the message initiating the second ARQ reset procedure; and proceeding with the first ARQ reset procedure initiated by the first device.

10. The apparatus of claim 9, wherein the first device and the second device are communicatively coupled via an ARQ-enabled connection.

11. A computer-program storage apparatus for wireless communication, comprising a non-transitory, computer readable storage medium storing instructions that when executed by one or more processors cause the one or more processor to:

initiate, at a first device, a first automatic repeat request (ARQ) reset procedure;

receive, at the first device, a message initiating a second ARQ reset procedure transmitted by a second device;

determine if both the first and second devices have initiated an ARQ reset procedure; and take action to limit a loss of blocks of data exchanged between the first and second devices, if both the first and second devices have initiated an ARQ reset procedure, wherein the instructions that cause the one or more processor to take action comprise instructions that cause the one or more processor to:

ignore the message initiating the second ARQ reset procedure; and proceed with the first ARQ reset procedure initiated by the first device.

12. The computer-program product of claim 11, wherein the first device and the second device are communicatively coupled via an ARQ-enabled connection.

* * * * *